United States Patent

[11] 3,551,701

| [72] | Inventor | Donald A. Carlson |
| | | Des Plaines, Ill. |
| [21] | Appl. No. | 715,393 |
| [22] | Filed | Mar. 22, 1968 |
| [45] | Patented | Dec. 29, 1970 |
| [73] | Assignee | Teletype Corporation |
| | | Skokie, Ill. |
| | | a corporation of Delaware |

[54] ELECTRONIC AC SWITCH
1 Claim, 2 Drawing Figs.

[52] U.S. Cl............................................. 307/252, 307/305
[51] Int. Cl........................................ H03k 17/00, 17/00, H03k 17/56

[50] Field of Search............................................. 307/252, 305P

[56] References Cited
UNITED STATES PATENTS
3,390,275   6/1968   Baker............................. 307/252X

*Primary Examiner*—Donald D. Forrer
*Assistant Examiner*—John Zazworsky
*Attorneys*—J. L. Landis and R. P. Miller ABSTRACT: An electronically-controlled AC switch uses a silicon-controlled rectifier circuit for initially supplying AC power to a load only when there is substantially no voltage across the load and for discontinuing the supply of AC power to the load only when there is substantially no current flowing through the load, irrespective of the times at which the load control switch contacts are opened or closed.

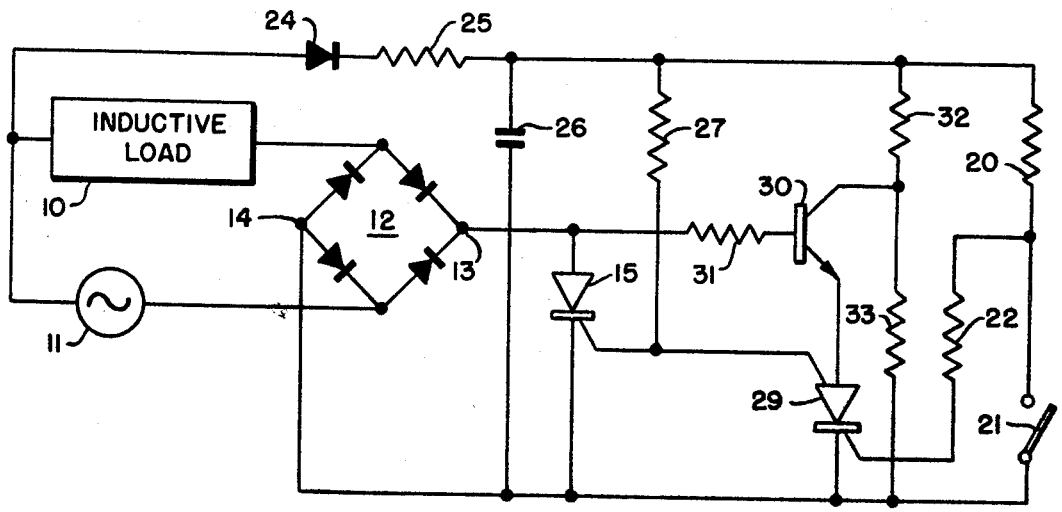

3,551,701

ELECTRONIC AC SWITCH

BACKGROUND OF THE INVENTION

In the operation of data communication apparatus, it often is necessary to control an inductive load (such as a motor or a transformer) that is to be supplied with AC power. The inductive AC load to be controlled often is located near sensitive electronic circuits; and if the controlling means is a simple contact switch and if the switch is closed at or near the peak voltage of the AC supply, the resulting current surge through the load may interfere with the operation of nearby circuits. Similarly if the switch is opened at or near the peak current through the inductive load, the radio frequency radiation resulting from the interruption of current through the load may cause malfunction of the electronic circuits in the vicinity of the switch and also may result in undesirable radio frequency transmission to unauthorized receivers.

SUMMARY OF THE INVENTION

In accordance with a preferred embodiment of this invention, a first silicon-controlled rectifier (SCR) is connected across the DC terminals of a switching rectifier placed in series with an inductive load and a source of AC power. A second SCR or silicon-controlled switch (SCS) is utilized to control the bias potential on the gate of the first SCR, and the second SCR or SCS is controlled by a contact switch which is opened to reduce the AC current through the load substantially to zero and which is closed to cause the desired AC current to flow through the load. The circuit interconnections cause current initially to be applied to the inductive load only when the 60-cycle power source is at substantially zero voltage and the circuit to the load is broken only at times when the current through the load is substantially zero.

BRIEF DESCRIPTION OF DRAWING

FIG. 1 is a circuit diagram of a preferred embodiment of the invention; and

FIG. 2 is a circuit diagram of a second preferred embodiment of the invention.

DETAILED DESCRIPTION

Referring now to FIG. 1 of the drawings, there is shown a circuit for initially providing AC power to an inductive load only when the output of the AC power source is at substantially zero voltage and for breaking the circuit to the inductive load only when the current through the load is substantially zero. Power is supplied to an inductive load 10 from a source of AC power 11 through a full-wave switching rectifier 12 (providing a pulsating, unfiltered DC output) connected in series with the load 10 and the source of power 11. When the DC output terminals 13 and 14 of the rectifier 12 are substantially short-circuited by a silicon-controlled rectifier (SCR) or static latching switch 15 connected in series with a pair of biasing diodes 16, the energizing circuit for the load 10 is complete and the load is energized in substantially the same manner as if the rectifier 12, the SCR 15 and diodes 16 were not present. On the other hand, when the DC outputs 13 and 14 of the rectifier 12 are open circuited or are interconnected by a high impedance, this is reflected as an open circuit condition at the AC inputs to the bridge rectifier 12; and little or no power from the source 11 is supplied to the load 10.

When the SCR 15 is rendered conductive by the application to its gate of a voltage that is more positive than the voltage applied to its cathode from the terminal 14 of the rectifier 12 through the diodes 16, the SCR 15 is substantially a short circuit from its anode to cathode. Since a characteristic of an SCR is that once it is rendered conductive it will continue conducting current irrespective of the voltage at its gate so long as current is supplied to it, the fact that the gate voltage may become as negative as the cathode voltage during the time that the SCR is conducting has no affect on the current flowing through it. If the gate potential is as negative as the cathode at a time when the current through the anode reaches zero, however, the SCR 15 becomes nonconductive and substantially an open circuit is placed across the DC terminals 13 and 14 of the rectifier 12. As a result, at any time that the gate of the SCR 15 is maintained at voltage that is as negative as the voltage on the cathode, the SCR 15 remains conducting until the anode current drops to zero, at which time the SCR 15 becomes nonconductive and remains nonconductive.

The positive output terminal 13 of the rectifier 12 also is connected through a high impedance resistor 19 to the anode of a second SCR 18, the cathode of which is connected to the negative output terminal 14 of the rectifier 12. The gate of the SCR 15 is connected to the anode of the SCR 18 so that the gate of the SCR 15 is held at substantially the voltage of the negative output terminal 14 of the rectifier 12 whenever the SCR 18 is conducting current. When the SCR 18 is rendered nonconductive, a positive potential is applied through the resistor 19 to the gate of the SCR 15 to bias the gate of the SCR 15 to a more positive potential than the potential applied to the cathode thereof. As a consequence, when the SCR 18 is conductive, the SCR 15 becomes nonconductive as soon as the anode current flowing through it drops to zero, and the SCR 15 is held nonconductive until the SCR 18 once again is rendered nonconductive.

The voltage applied to the gate of SCR 18 is controlled by a load control contact switch 21 connected in series between the cathode of the SCR 18 and its gate. The gate of the SCR 18 also is connected through a high impedance resistor 20 to the junction between the resistor 19 and the anode of the SCR 18. When the switch 21 is closed, the gate of the SCR 18 is held at substantially the voltage present on its cathode, causing the SCR 18 to be held in a nonconductive state. When the switch 21 is opened, the rectified signal voltage is applied through the resistor 20 to the gate of the SCR 18 causing the gate to be biased positively with respect to the cathode, and the SCR 18 conducts current.

Assuming that the switch 21 is open and has been open for a substantial length of time, the SCR 18 is caused to conduct by virtue of the bias supplied to its gate through the resistor 20; and the SCR 15 is nonconductive due to the fact that the potential applied to its gate is substantially the same as the potential applied to its cathode. Although some current does flow through the SCR 18 and the resistor 19, the impedance of the resistor 19 is sufficiently high that this current is substantially zero. As a consequence, only a very small control current flows through the inductive load 10.

If the switch 21 then is closed, the gate of the SCR 18 is placed at substantially the same voltage as the cathode, but current continues to flow through the SCR 18 until the voltage between the positive output terminal 13 and the negative output terminal 14 of the rectifier 12 becomes essentially zero. This occurs at the crossover voltage between half-cycles of the AC signal supplied by the signal source 11. At this time, current ceases to flow through the SCR 18 and it becomes nonconductive. As soon as this happens, the potential on the anode of the SCR 18 obtained through the resistor 19 rises in accordance with rise in potential on terminal 13 of the rectifier 12; and as soon as voltage is again available across the rectifier 12 at the start of the next half-cycle of the AC source 11, current begins to flow through the SCR 15 and the load 10, with the SCR 15 remaining conductive as long as the load control switch 21 is closed. In summary, it can be seen that current flowing through the load 10 is initiated only at a point of substantially zero voltage from the AC source 11, since the SCR 15 cannot be rendered conductive until a point of zero voltage is reached to cause the SCR 18 to be rendered nonconductive, provided the switch 21 is closed.

When it is desired to turn "off" the current through the load 10, the load control switch 21 is opened, permitting a positive biasing potential to be applied to the gate of the SCR 18 through the resistor 21. The SCR 18 then is rendered conductive, clamping the gate of the SCR 15 to substantially the voltage present on the cathode of the SCR 15. The SCR 15, however, continues conducting current until the current through the SCR 15 and the current through the load 10 drops to substantially zero, at which time the SCR 15 is rendered nonconductive and remains nonconductive until the load control switch 21 is closed again. As stated previously, the small amount of control current flowing through the resistor 19 and the SCR 18 under this "off" condition is insufficient to energize the load 10.

Since silicon-controlled rectifiers (SCR's) generally require a significant amount of gate current to turn on, the SCR's used in the circuit shown in FIG. 1 do not generally turn on at exactly the point of zero AC voltage. The circuit shown in FIG. 2 is intended to correct this switching imperfection by increasing the switching current available to the gate of the SCR 15 without drawing excessive leakage current through the load. The elements in the circuit of FIG. 2 which are comparable to like elements in the circuit of FIG. 1 are given the same reference numbers.

Thus, an inductive load 10 is supplied with AC power from a source 11 through a full-wave switching rectifier 12, the DC output terminals of which are shunted by an SCR 15. Instead of merely using a second SCR, such as the SCR 18 shown in FIG. 1, to control the gate of the SCR 15, an auxiliary DC power supply has been added consisting of a diode 24, a resistor 25 and a filter capacitor 26. The diode 24 is connected to the junction of the load 10 and signal source 11 and provides a half-wave rectified DC reference voltage through the resistor 25 and a resistor 27 to the gate of the SCR 15. A silicon-controlled switch (SCS) 29 is used in place of the second SCR 18 shown in FIG. 1 with the gate of the SCR 15 being connected to the anode gate of the SCS 29.

The anode of the SCS 29 is supplied with a pulsating DC voltage by an emitter follower NPN transistor 30 which is connected through a base resistor 31 to the pulsating DC voltage present on the terminal 13 of rectifier 12. It should be noted that this is the same pulsating DC voltage which is applied to the anode of SCR 15. The collector potential for the transistor 30 is obtained from a voltage divider consisting of a pair of resistors 32 and 33 which are supplied with voltage from the auxiliary DC supply obtained from the diode 24. Whenever the voltage applied to the anode of the SCR 15 is zero, the transistor 30 is cut off, and the anode of the SCS 29 is not supplied with bias voltage. As voltage builds up across the anode of the SCR 15, the transitor 30 quickly turns on and rapidly supplies the full bias potential obtained from the diode 24 to the anode of the SCS 29, while the voltage of the anode of the SCR 15 still is at a very low level.

Assume that the load control switch 21, which controls the operation of the circuit, is opened. The cathode gate of the SCS 29 then is supplied with a positive bias voltage through the resistor 20 and a resistor 22, causing the SCS 29 to be biased into conduction. The pulsating DC voltage supplied to the base of the transistor 30 through the resistor 31 causes anode biasing voltage to be applied to the anode of the SCS 29 almost continuously with the exception of the short intervals when the voltage of the AC supply passes through zero. Since the SCS 29 is conductive at this time, the anode and anode gate of the SCS 29 both are at substantially the potential of the negative DC terminal 14 of the rectifier 12, thereby maintaining the SCR 15 in a nonconductive state. As a consequence, only an insignificant amount of current flows through the load 10.

If the load control switch 21 then is closed, the cathode gate of the SCS 29 immediately is biased to a potential which is substantially the same as that present on its cathode, but the SCS 29 continues conducting anode current so long as bias current is supplied to the anode through the transistor 30. When the AC supply voltage passes through a zero point, the transistor 30 is momentarily rendered nonconductive and stops supplying biasing voltage to the anode of the SCS 29. The SCS 29 then becomes nonconductive; and since the potential on the cathode gate of the SCS 29 is insufficient to bias the SCS 29 into conduction so long as the switch 21 is closed, the SCS remains nonconductive. As the AC voltage again builds up, however, the SCR 15 becomes conductive since the gate of the SCR 15 is held at substantially the DC reference potential obtained from the diode 24, and the SCR 15 conducts at almost exactly the point of zero AC voltage since a substantial gate current is supplied to the SCR 15 from the diode 24 through the resistors 25 and 27. The SCR 15 then remains conductive so long as the switch 21 is closed, with conduction being initiated only when zero voltage is present from the AC source 11.

When the load control switch 21 again is opened, the SCS 29 is immediately rendered conductive and clamps the gate of the SCR 15 to the negative potential present on the terminal 14 of the rectifier 12. The SCR 15, however, continues to conduct current until there is a current reversal through the load, at which time the SCR 15 turns off and remains off so long as the load control switch 21 remains open. Thus the load is turned "off" at a point of substantially zero current.

Although two particular embodiments of the invention have been shown in the drawings and described in the foregoing specification, other modifications of the invention, varied to fit particular operating conditions, will be apparent to those skilled in the art; and the invention is not to be considered limited to the embodiments chosen for the purpose of disclosure but covers all changes and modifications which do not constitute departures from the true scope of the invention.

I claim:

1. An AC switch including:
   an AC power supply;
   a load;
   a full-wave rectifier, the AC input terminals of which are connected in series with the load and the power supply;
   a silicon-controlled switch connected to the DC output of the rectifier biased into conduction by external signals and rendered nonconductive in the absence of said external signals when the voltage at the output of the rectifier is at a minimum value;
   a silicon controlled rectifier connected in series with the DC output of the rectifier and controlled by the silicon-controlled switch, being rendered conductive when the silicon-controlled switch is rendered nonconductive and being rendered nonconductive when the silicon-controlled switch is conductive at a time when the current through the silicon-controlled rectifier is at a minimum value;
   means for supplying said external signals to the silicon-controlled switch; and
   the anode gate of the silicon-controlled switch being connected to the gate of the silicon-controlled rectifier and further including an auxiliary source of DC potential supplied to the anode of the silicon-controlled switch.